Jan. 9, 1951  A. M. LANKFORD ET AL  2,537,142
PREFORMED AND PRESHADED JACKET CROWN
AND METHOD OF FITTING SAME
Filed May 2, 1947

Inventor
ALLAN M. LANKFORD.
DONALD G. RUSSELL.
ROBERT W. WHITNEY.
BY Howard J. Whelan.
Attorney Patented Jan. 9, 1951

2,537,142

UNITED STATES PATENT OFFICE 2,537,142

PREFORMED AND PRESHADED JACKET CROWN AND METHOD OF FITTING SAME

Allan M. Lankford, Baltimore, Donald G. Russell, Jarrettsville, and Robert W. Whitney, Baltimore City, Md.

Application May 2, 1947, Serial No. 745,564

1 Claim. (Cl. 32—12)

This invention refers to dental devices and more especially to the various dental shells or jacket crowns employed to cover up tooth stumps or renew the individual structure of defective teeth, with material having the same visual appearance as normal teeth.

It has been customary for some time, to employ dental jacket crowns as coverings over old defective teeth individually but such are slipped on and used as a temporary artifice. They have no permanent value. They can not be fitted accurately and usually are very difficult to mount in their present forms. In other instances, artificial teeth made up solidly of porcelain and provided with metal pins, are secured to the stumps by drilling a hole for the pin, which is cemented in place. This drilling is particularly hard and painful to the patient and is objected to by the latter.

The disadvantages of these types of tooth substitutions are obvious, particularly the amount of time taken to install them and the inconvenience they cause.

In this invention it is an object to provide a new and improved dental jacket crown that will avoid one or more of the disadvantages and limitations of the prior art.

Another object of the present invention is to provide a new and improved dental jacket crown that can be fitted accurately to the stump of a tooth and will present a finished appearance, while at the same time causing little inconvenience to the individual who is to use it.

Another object of the present invention is to provide an assortment of preformed and preshaded plastic dental jacket crowns from which a selection may be made to individually match the other teeth in the mouth for color and shape and fit said crown thereto without the use of color and shape charts.

Another object of the present invention is to provide a method of preforming and shading a dental plastic jacket crown or the like and fitting said crown to a tooth stump.

Another object of the present invention is to provide a hollow preformed and preshaded acrylic (methyl methacrylate resin) or other type of plastic jacket crown, filling same with impression material and pressing same against the tooth stump it is to fit over and receive an impression therefrom, making a facsimile mold of said stump, removing the impression material from said jacket crown and filling the cavity with liquid acrylic (methyl methacrylate resin), inserting the stump mold in said liquid and treating it and the jacket until they become a homogeneous jacket crown with an internal cavity formed to fit snugly on the tooth stump removal of said stump mold, applying adhesive cement to said stump and applying the jacket crown thereon.

A further object of the invention is to provide a new and improved dental jacket crown that can be made up to suit the dental work of an individual, yet follow a routine that has the characteristics of manufacturing production methods.

Other objects of the invention will become evident as it is more fully detailed and its principles indicated.

For a clearer understanding of the invention and its objects, reference is made to the accompanying drawings, and the following description. These together outline a particular form of the invention, by way of example, while the claims emphasize the scope of the invention.

In the drawings.

Similar reference characters refer to similar parts throughout the drawings.

Figure 1:
Figure 1 is a front view of a tooth with a jacket crown attached thereto, embodying this invention.
Figure 2:
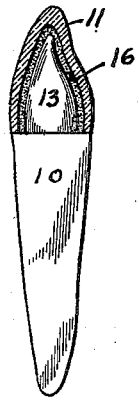
Figure 2 is a side elevation of Figure 1 in section to show its interior construction.
Figure 4:
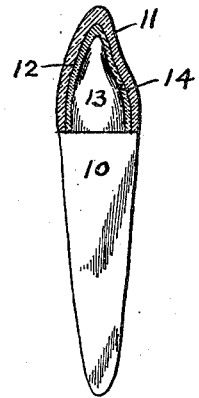
Figure 4 is a side elevation in section showing the impression wax positioned in the jacket crown at the time of taking the impression of the stump.
Figure 3:
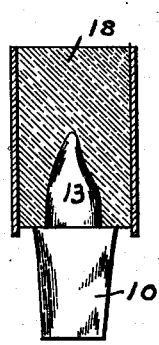
Figure 3 is a side elevation of the stump at the time of taking the impression for the making of the facsimile.
Figure 5:
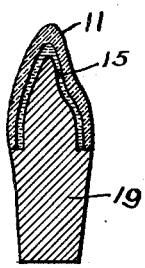
Figure 5 is a side elevation in section showing the jacket crown containing the liquid plastic being pressed on the facsimile.

In the particular form of dental jacket crown 11 illustrated in the drawings, its structure is designed exteriorly to follow the general contour of a human tooth 10. The jacket crown 11 consists of a hollow shell, made of acrylic (methyl methacrylate resin) or some other material of a suitable nature and color, and reasonably thick to stand the peculiar stresses incurred in its uses. The interior contour 12 of the crown is preformed and of a larger dimension than the stump of the tooth to which it is to be attached so it may be readily adjusted thereon to suit. A cast of plaster of Paris or other suitable wax or composition 18 is made of the stump 13. The cast is filled with a metallic substance such as silver amalgam used by dentists for filling teeth (called silver fillings) or other suitable material to form a facsimile stump 19 of the portion of the stump 13 which is to support and hold the crown during use. This facsimile is for use by the dental technician. The interior contour 12 of the crown 11 is filled with liquid 15 acrylic (methyl methacrylate resin) or the same substance used in forming the jacket crown originally. The facsimile cast of the stump is then positioned in the liquid and forced against the edge of the jacket crown 11, and allowed to set with the artificial or replica stump in it. After the setting of the plastic body and obtaining an accurate hollow in it conforming with the stump, the crown complete with the plastic body which has now become homogeneous with the jacket crown is removed from the facsimile cast by the dental technician.

This completed jacket crown is then returned to the dentist, who in turn mounts it on the original stump of the individual it belongs to. After being assured that it fits accurately, including not only the tooth proper but the cartilage adjacent to it, the dentist removes it and covers the interior surface with a suitable plastic adhesive 16, replaces it on the stump and allows it to become solidly attached to it. Acrylic (methyl) methacrylate resin has been found appropriate for this work and is preferably used. The matter of trimming the material about the crown tooth follows conventional dental procedure, except that less work is involved. The manner of arranging the crown jacket in this manner is new in that the resulting crown is a special form of tooth that can be homogeneously incorporated with the patient's tooth, and not simply as a conventional cap covering it with a large sloppy hole therein, which is filled with cement to which all stresses and strains are transferred during use and which causes the crowns to loosen and fall out. With the jacket of this invention, the tooth takes on the appearance of a natural tooth in the mouth of the user.

Since the jacket crown fits accurately on the stump it can be made subject to hard usage without danger of injuring it. Its color is natural because it may be accurately determined at the beginning and by using the actual crown to be inserted, in the mouth of the patient at the beginning, after it has been selected for shape and color. In other words, the actual crown is chosen in the presence of the patient and not based on a color chart or samples held up in the place against the tooth and ordered by a catalog number, for the dental mechanic to pick out later at a different location. The dentist using this invention avoids the color and tooth form chart, by using the actual shells or crowns themselves, which are to be made available to him in quantity to meet his requirements in all shades and shapes.

The attachment of the jacket crown directly to the stump and its cartilage, makes it very strong and cooperating within the gum and renders a very natural structure.

The process of making the attachment is relatively quick and avoids pain and physical inconvenience, and is less expensive to use.

While but one general form of the invention is shown in the drawings and described in the specification, it is not desired to limit this application for patent to this particular form or in any other way otherwise than limited by the scope thereof, as it is appreciated that other forms of construction could be made that would use the same principles and come within the scope of the appended claim.

Having thus described the invention, what is claimed is:

The method of preparing a cover for a tooth stump consisting in making a cast replica of the stump, mounting a jacket crown on the replica, filling the space between the jacket crown and the stump with methyl methacrylate resin to produce a shell upon hardening of the resin adhering to the internal wall of the jacket crown, removing said jacket crown and shell from said replica and securing said jacket crown and shell upon the tooth stump.

ALLAN M. LANKFORD.
DONALD G. RUSSELL.
ROBERT W. WHITNEY.

REFERENCES CITED

The following references are of record in the file of this patent:

UNITED STATES PATENTS

| Number | Name | Date |
| --- | --- | --- |
| 1,372,772 | Nishi | Mar. 29, 1921 |
| 1,431,425 | Richmond | Oct. 10, 1922 |
| 2,194,790 | Gluck | Mar. 26, 1940 |
| 2,219,058 | Streim | Oct. 22, 1940 |
| 2,327,548 | Pearlman | Aug. 24, 1943 |